United States Patent [19]

Mastrangelo

[11] 4,273,593
[45] Jun. 16, 1981

[54] METAL-JOINING PASTE AND VEHICLE THEREFOR

[75] Inventor: Albert J. Mastrangelo, North Olmsted, Ohio

[73] Assignee: SCM Corporation, New York, N.Y.

[21] Appl. No.: 114,235

[22] Filed: Jan. 22, 1980

Related U.S. Application Data

[63] Continuation-in-part of Ser. No. 52,063, Jun. 25, 1979.

[51] Int. Cl.$^3$ ............................................. B23K 35/34
[52] U.S. Cl. ....................................... 148/24; 148/25
[58] Field of Search ..................................... 148/23–25

[56] References Cited

U.S. PATENT DOCUMENTS

| 3,030,242 | 4/1962 | Gieselman | 148/23 |
| 3,073,270 | 1/1963 | Johnson | 148/24 |

*Primary Examiner*—P. D. Rosenberg
*Attorney, Agent, or Firm*—Merton H. Douthitt; Gordon P. Becker

[57] ABSTRACT

Improved soldering or brazing paste compositions comprising a metal alloy powder and a vehicle therefor have been developed. The vehicle comprises hydroxypropyl cellulose blended with glycerine and/or water further blended with a mixture of polyalkoxyalkanols. Said vehicle is totally fugitive, leaving exceptionally low residue and maintains stable viscosity during extended storage.

15 Claims, No Drawings

METAL-JOINING PASTE AND VEHICLE THEREFOR

This patent application is a continuation-in-part of copending application Ser. No. 052,063 of June 25, 1979.

It relates to paste vehicles and to such vehicles blended with metal powder or metal-forming powder for making a paste suitable for joining metals, such as by brazing or soldering.

Heretofore it has been proposed to employ as such vehicle components various hydroxylated solvents such as water, glycerine, alkanols, various glycols, and various monoalkoxyethanol-1 substances, as well as ketones, ethers, hydrocarbyl and halogenated hydrocarbyl materials, carboxylic acid, tetrahydrofuran, and a plethora of mixtures of such solvents.

These are bodied with cellulosic thickening agents such as ethyl hydroxyethyl cellulose, hydroxypropyl cellulose, cellulose acetate butyrate, and cellulose nitrate. Some of these vehicles can contain "adhesives" such as dextrin and the like, and many contain preservatives in minute concentration to inhibit bacterial attack. They also contain a variety of metal-joining fluxing and etching agents and frequently have plasticizing ingredients.

The vehicles and pastes thus previously formulated have found only limited usefulness because of undesirable residue left when, say, brazing was conducted in a non-reactive atmosphere, or the compositions deteriorated in extended storage to lose viscosity or harden or skin, or the paste had erratic flow properties during use.

Advantages of the present invention include low residue, even when using a non-reactive atmosphere, resistance to deleterious change in viscosity even when stored for extended periods at 150° F., and consistently satisfactory flow properties in use.

The instant invention is based on the discovery that such vehicles and pastes containing carefully controlled proportions of hydroxypropyl cellulose and polyalkoxyalkanols in admixture can be used to overcome deficiencies of prior paste formulations and broaden the paste usefulness significantly. While not being bound by any theory, applicant submits that the hitherto unforeseen and unpredictable temperature-solubility relationship of useful concentrations of hydroxypropyl cellulose in admixture with polyalkoxyalkanols that further contain glycerine and/or water function to stabilize desirable properties of the vehicle and joining pastes made therefrom in a region particularly useful in the instant service.

BROAD STATEMENT OF THE INVENTION

The present invention is a metal-joining paste and particularly a vehicle therefor comprising hydroxypropyl cellulose (HPC) dissolved in a mixture of polyalkoxyalkanols and further comprising a minor proportion of glycerine and/or water. Another aspect of the present invention is a metal-joining operation utilizing said metal-joining paste.

DETAILED DESCRIPTION OF THE INVENTION

The instant metal-joining paste is bodied with a controlled portion of hydroxypropyl cellulose (HPC). HPC is used from 0.1 to about 10 parts by weight of the total vehicle and is preferably used from about 0.5 to 5 parts by weight of the vehicle. The level of HPC is determined by the viscosity desired for the vehicle and resulting paste (higher levels yield higher viscosities) and the level of other solvents and materials in the vehicle formulation. HPC is available in a wide range of molecular weights ranging from several thousand to greater than one million, and the molecular weight of the HPC used will also affect the viscosity (higher molecular weights yield higher viscosities). Typically, the instant vehicle composition has an initial apparent viscosity of between about 5,000 and 50,000 centipoises.

The HPC is dissolved in a mixture of polyalkoxyalkanols. About 55 to about 99 parts by weight of this solvent mixture is used in a typical formulation. Polyalkoxyalkanols suitable for use in the present invention include diethylene glycol methyl ether, diethylene glycol ethyl ether, diethylene glycol butyl ether, diethylene glycol hexyl ether, dipropylene glycol butyl ether, and dipropylene glycol methyl ether. Individually, these materials have not been found suitable for making the instant vehicles; however, when mixed together, the resulting mixture has been found useful for making metal-joining vehicles and pastes.

Preferably, the mixture of solvents containing dipropylene glycol methyl ether and either diethylene glycol butyl ether or diethylene glycol hexyl ether. In one particularly advantageous embodiment of the present invention a mixture of dipropylene glycol methyl ether and diethylene glycol butyl ether is used having a ratio of these between about 1:1 and about 8:1, respectively. Within these ratios a vehicle exhibiting virtually no deterioration during storage even at temperatures up to 65° C., having extremely low residue and excellent flow properties during use can be produced. The instant vehicles, and metal-joining paste made therefrom are capable of storage without deterioration for a period in excess of a month at temperatures elevated in excess of about 50° C. and preferably about 65° C. Further, such vehicles and paste can be cycled from about −40° C. to room temperature several times without deterioration. To avoid deterioration during storage, it is important that the vehicle composition remain a solvent for its HPC content at the temperatures experienced during storage, e.g., up to 50° C. typically.

Vehicle can be produced using only a single polyalkoxyalkanol, however, such vehicle would be deficient in one or more respects. For example, if dipropylene glycol methyl ether is used exclusively as solvent, paste produced using this vehicle would tend to skin during storage. Similarly, if diethylene glycol butyl ether or diethylene glycol hexyl ether are used individually, the pastes produced from these vehicles would tend to have erratic and undesirable flow properties during use.

The vehicles of the present invention also should contain glycerine and/or water. This component has not been found to exert a great effect on the residue produced by the vehicle, but has been found to have a great effect on the tendency of the vehicle and paste to deteriorate during storage. About 1 to 20 parts by weight of this material can be used in the instant vehicle composition. Either glycerine or water individually will help prevent deterioration during storage; however, in low concentrations of about 2%, water has been found to be more effective than glycerine in this respect. Glycerine, on the other hand, has the advantage that during rapid heat-up of the paste during the soldering or brazing operation, it will not spatter. Water containing paste tends to spatter if it is heated too rapidly. Thus, there is a greater flexibility in the heating rate that can be used for soldering and brazing operations using a glycerine-bearing paste than for water-bearing paste, including even torch brazing.

Vehicles of the instant invention can be formulated completely anhydrous. This is particularly advantageous when it is desired to braze metals which are adversely affected by the presence of water in the brazing paste. Hydrogen is frequently released from hydrous brazing paste during a brazing or soldering operation and can be deleterious to numerous metals. Particularly, the presence of hydrogen cannot be tolerated when brazing aluminum parts. Therefore, the instant vehicle can find advantageous application in such brazing operations.

Optionally, the vehicle can contain up to about 50% of a metal-joining fluxing or etching agent. Virtually any of the fluxing or etching agents conventionally used in brazing and soldering compositions can be used with the instant composition. Examples of fluxes include alkali metal fluoroborates, alkali metal carbonates, alkali metal tetraborates, boric acid, hydrohalide salts of hydroxy amines such as 2-amino-2-methyl-1,3-propane diol, alkali metal fluorides such as sodium fluoride and alkaline earth metal fluorides such as barium fluoride. If the fluxing or etching agent used contains alkali metal ions, then such flux should be used in limited quantities because the alkali metal ion will typically produce a salt which contributes to the residue on ignition of the vehicle. Alkaline earth metal ions such as in barium fluoride do not contribute as significantly to the residue. This becomes particularly important when oxidizing components in the atmosphere must be avoided during the metal-joining operation such as, for example, joining mild steels in a vacuum. In every case, however, the use of excessive amounts of fluxing or etching agents should be avoided. Preferably less than 10% fluxing agent is used.

Specialized fluxes developed for special applications have also been found particularly satisfactory for use with the present vehicle. One such specialized flux is Nocolok TM (Nocolok is a registered trademark of Alcan Aluminum Corporation for a group of potassium fluoaluminate complex fluxes). Nocolok TM fluxes, together with the instant vehicle and appropriate metal powder have been found to produce a particularly good paste for joining aluminum and aluminum alloy parts. Such special fluxing agents can often be used at even higher levels than conventional fluxing agents. Levels up to 50 parts by weight and higher are possible.

Optionally, the vehicle can also contain up to about 3% surfactant to improve its surface wetting properties. Improved wetting will tend to keep the vehicle in a homogeneous state, keep the metal powder particles in suspension, and improve the soldering and brazing characteristics on the pastes made therefrom. During metal-joining operations, improved wetting will cause the paste to adhere to the metals that are to be joined more readily and thus improve the contact of the brazing alloy during use. Virtually any of the surfactants used conventionally in metal-joining paste compositions can be employed here. Examples of such surfactants include polyphenoxy derivatives, fatty acid polymers, linear and branched alcohols with less than about 10 carbon atoms and their esters, and acetelenic glycols.

One particularly effective surfactant preferred for use in the present vehicles is Zonyl ® (a registered trademark of E. I. duPont de Nemours and Company for a group of fluorosurfactants). Use of as little as about 0.01 parts by weight of Zonyl ® has been found effective for improving the wetting characteristics of these vehicles.

The present vehicle can optionally contain minor amounts of other materials used in conventional fashion without departing from the concept of this invention. Such other materials include preservatives, modifiers, sequestrants, dispersion agents, rheology control agents, antibacterial agents, and the like.

To make a metal-joining paste, the vehicle is blended with a fine particulate elemental metal powder, metal alloy powder, or metal-forming powder, herein collectively or disjunctively referred to as metal powder. The metal powder typically used for making metal-joining paste is principally comprised of copper, silver, nickel, cadmium, tin, lead, aluminum, and/or zinc. Sometimes it is advantageous to use these materials alone or they may be dosed or alloyed with a proportion of phosphorus, silicon, manganese, or aluminum. Also, other alloying constituents commonly used include gold, indium, boron, bismuth, antimony, chromium, and titanium. When the metal-joining operation is to be practiced in a reducing atmosphere, a metal-forming powder can be used. Such metal-forming powders include copper oxide, silver oxide, nickel oxide, zinc oxide, and the like. Commonly used metal powders include elemental copper, copper/phosphorus, copper/tin, nickel alloy, aluminum/silicon, tin/lead, and copper oxide powders.

The composition of the metal powder used with the instant vehicle has not been found to exhibit a great effect on viscosity or deterioration of the vehicle during storage. This compatibility is believed to be due to the relative inertness of the instant vehicle towards metal powders in general.

The metal powder is comminuted into fine, particulate form (powder) so that it is easily dispersed in a vehicle and maintained in suspension. The powder should at least pass through a 48-mesh (295 microns) Tyler Standard Sieve. Typically, the powder is finer than 100 mesh (147 microns) because larger particles are difficult to disperse and maintain in suspension in the paste. Powder having a particle size of 325 mesh (43 microns), or finer, is preferably employed and is satisfactory for making a metal-joining paste. Powders having particles substantially finer than 325 mesh can be used; however, no additional benefit is derived from using such exceptionally fine powder.

Typically, about 3 parts by weight of metal powder is blended with 1 part by weight of vehicle (75% metal powder and 25% vehicle). However, as much as 20 parts by weight and little as 1 part by weight of metal powder can be blended with one part of vehicle for some special applications (50–95% of metal powder and 5–50% vehicle). In any event, there must be at least sufficient vehicle to impart a semifluid nature to the composition and yet not so much vehicle that the metal powder readily settles out of the composition. Typically, such paste composition has an initial apparent viscosity between about 5,000 poise and 200,000 poise. The preferred viscosity will depend primarily on the method of dispensing or application of the paste to the materials to be joined, e.g., hand trowelling pastes are generally more satisfactory at a higher viscosity than are pastes intended for automatic dispensing such as extruding, flowing, or spraying. Initial apparent viscosity is most easily obtained by raising or lowering the HPC level in the vehicle. Viscosity can also be substantially affected by the amount of solvent mixture present, amount of glycerine and/or water present, and the vehicle-to-metal powder ratio.

The vehicle and paste of the present invention have particularly low residue when used in metal-joining operations. Typically, the residue left by cellulosic resin is determined by their ash content. Ash content is a measure of the impurities in the cellulosic residue. However, one surprising feature of the instant vehicle is that HPC used in the instant vehicle provides a lower residue than other cellulosic resins of similar ash content. For example, substitution of hydroxyethyl cellulose (HEC) of equal ash content for the HPC of the present invention produces a vehicle with a higher residue level than the instant vehicle.

The residue of the vehicle or paste composition is particularly important when the atmosphere in which the metal-joining operation is conducted does not contain any oxidizing components. Oxidizing components in the atmosphere tend to lower the amount of residue left in and around the metal joint.

Atmospheres which do not contain oxidizing components are often referred to as non-reactive atmospheres and include dissociated ammonia, purified hydrogen, vacuums, and others having low dew points. These atmospheres must be used when joining metals such as stainless steels. The vehicle and paste of the present invention provide sufficiently low residues even under these conditions, whereas none of the vehicles of the prior art were suitable.

The following examples will show ways in which I have practiced this invention. These examples are not intended to be limiting of the invention. In the examples, all temperatures are in degrees Fahrenheit and all percentages and ratios are in parts by weight, unless otherwise stated.

EXAMPLE 1

A vehicle of the following composition was prepared:
65.7 parts dipropylene glycol methyl ether
22.0 parts diethylene glycol butyl ether
10.0 parts glycerine
2.0 parts hydroxypropyl cellulose
0.2 parts sodium fluoride
0.1 parts Zonyl ® FSN The glycerine was placed in a beaker and agitated at about 250 RPM's using a Heller laboratory stirrer, while the HPC and sodium fluoride were slowly added. Mixing was continued for about 5 minutes after the additions were completed. Care must be taken to prevent lumping of the HPC and sodium floride as it is added. The dipropylene glycol methyl ether and diethylene glycol butyl ether were combined in a separate mixing tank and stirred for about 5 minutes. The HPC/sodium fluoride/glyceride mixture was then added and mixing was continued for about 4 hours. The Zonyl ® FSN was then added and mixing was continued for another hour. This vehicle had an initial viscosity of about 28,000 centipoise (cps) and this viscosity remained essentially unchanged (±2%) for a period of greater than 60 days.

EXAMPLE 2

In the procedure of Example 1, 2.5 parts of H₂O was substituted for the 10 parts of glycerine. The vehicle so produced had an initial viscosity of about 25,000 cps and remained at essentially the same viscosity for a period of greater than 60 days.

EXAMPLE 3

25 parts of the vehicle of Example 1 was mixed with 75 parts of brazing alloy powder. The alloy powder was designated BCU-1a (American Welding Society Spec.) and contained a minimum of 99% Cu and a maximum of 0.30% of other elements. This alloy powder was further characterized by being about 70% past a 325 mesh screen (Tyler Standard Sieve), and 1.0% retained on a 150 mesh screen (Tyler Standard Sieve). The alloy has a melting point of about 1980° F. (1083° C.). Mixing was accomplished by using a Heller laboratory stirrer for about one hour.

The paste composition so produced had an initial viscosity of about 106,000 cps. A portion of this paste was stored at room temperature for 60 days and had a final viscosity of about 106,500 cps. Another portion was stored at about 55° C. and had a final viscosity of about 107,000 cps. No deterioration occurred.

This paste was applied by syringe to a joint between two pieces of 316L stainless steel. Brazing was conducted at 2050° F. in a 75% hydrogen/25% nitrogen atmosphere. This atmosphere has a dew point of −40° F. After brazing, the vehicle was found to be entirely fugitive and there was no detectable residue left behind from the vehicle, even though the atmosphere had a low dew point.

EXAMPLE 4

The paste of Example 3 was applied by syringe to a joint between to pieces of 316L stainless steel and brazed by heating in a vacuum furnace to 2050° F. The pressure in the furnace was held at 0.2 torr, and the heating rate was 12° C./minute. The joint was held at temperature (2050° F.) for 10 minutes and then allowed to cool to 120° F. The pressure was then increased to 760 torr and the joint was allowed to cool to room temperature. The vehicle was found to be entirely fugitive and there was no detectable residue left from the vehicle.

What is claimed is:

1. A vehicle for a metal-joining paste composition comprising in weight parts:
   0.1–10 parts hydroxypropyl cellulose, the concentration of said hydroxypropyl cellulose being sufficient for imparting initial apparent viscosity between about 5,000 and about 50,000 centipoises to said vehicle;
   1–20 parts selected from the group consisting of glycerine, water, and mixtures thereof;
   0–50 parts of fluxing agent;
   0–3 parts surfactant; and
   55–99 parts of a mixture of polyalkoxyalkanols, said composition being a solvent for its hydroxypropyl cellulose content at 50° C.

2. The vehicle of claim 1 wherein said mixture of polyalkoxyalkanols comprises dipropylene glycol methyl ether and diethylene glycol butyl ether.

3. The vehicle of claim 1 wherein said mixture of polyalkoxyalkanols comprises dipropylene glycol methyl ether and diethylene glycol hexyl ether.

4. The vehicle of claim 2 wherein the ratio of said dipropylene glycol methyl ether to diethylene glycol butyl ether is between about 1:1 and about 8:1.

5. The vehicle of claim 1 wherein said surfactant is a fluorosurfactant.

6. The vehicle of claim 1 wherein said vehicle is anhydrous.

7. The vehicle of claim 1 containing 0.5–5 parts hydroxypropyl cellulose.

8. A metal-joining paste composition comprising in parts by weight:
   50 to 95 parts metal powder, and
   5 to 50 parts vehicle, wherein said metal powder has a particle size of less than 295 microns and said vehicle comprises:
   0.1–10 parts hydroxypropyl cellulose, the concentration of said hydroxypropyl cellulose being sufficient for imparting initial apparent viscosity between about 5,000 and about 50,000 centipoises to said vehicle,
   1–20 parts selected from the group consisting of glycerine, water, and mixtures thereof,
   0–50 parts fluxing agent,
   0–3 parts surfactant, and
   55 to 99 parts a mixture of polyalkoxyalkanols, said vehicle composition being a solvent for its hydroxypropyl cellulose content at 50° C.

9. The metal-joining paste of claim 8 wherein said mixture of polyalkoxyalkanols comprises diethylene glycol butyl ether and dipropylene glycol methyl ether.

10. The metal-joining paste of claim 8 wherein said mixture of polyalkoxyalkanols comprises dipropylene glycol methyl ether and diethylene glycol hexyl ether.

11. The metal-joining paste of claim 9 wherein the ratio of said diethylene glycol butyl ether to dipropylene glycol methyl ether is between about 1:1 and 8:1.

12. The metal-joining paste of claim 8 wherein said surfactant is a fluorosurfactant.

13. The metal-joining paste of claim 8 wherein said vehicle is anhydrous.

14. The metal-joining paste of claim 8 which contains 0.5–5 parts hydroxypropyl cellulose.

15. In a brazing or soldering operation using a metal-joining paste with a vehicle the improvement comprising using as said vehicle a composition which comprises in weight parts:
   0.1–10 parts hydroxypropyl cellulose, the concentration of said hydroxypropyl cellulose being sufficient for imparting initial apparent viscosity between about 5,000 and about 50,000 centipoises to said vehicle,
   1–20 parts selected from the group consisting of glycerine, water, and mixtures thereof,
   0–50 parts fluxing agent,
   0–3 parts surfactant, and
   55 to 99 parts of a mixture of polyalkoxyalkanols, said vehicle composition being a solvent for its hydroxypropyl cellulose content at 50° C.

* * * * *